(12) United States Patent
Buckley et al.

(10) Patent No.: US 10,685,234 B2
(45) Date of Patent: Jun. 16, 2020

(54) AUTOMATIC AND SEMI-AUTOMATIC METADATA GENERATION VIA INHERITANCE IN HOMOGENEOUS AND HETEROGENEOUS ENVIRONMENTS

(75) Inventors: Robert Roy Buckley, Rochester, NY (US); Eric A. Bier, Palo Alto, CA (US)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/436,857

(22) Filed: Mar. 31, 2012

(65) Prior Publication Data

US 2013/0262505 A1 Oct. 3, 2013

(51) Int. Cl.
*G06K 9/00* (2006.01)
*G06F 16/583* (2019.01)
*G06F 16/51* (2019.01)

(52) U.S. Cl.
CPC ......... *G06K 9/00677* (2013.01); *G06F 16/51* (2019.01); *G06F 16/583* (2019.01)

(58) Field of Classification Search
CPC ........... G06F 17/30247; G06F 17/3028; G06F 16/583; G06F 16/51; G06K 9/00677
USPC ........................ 707/705, 722, 728, 758, 769
See application file for complete search history.

(56) References Cited

U.S. PATENT DOCUMENTS

| | | | |
|---|---|---|---|
| 7,107,520 B2 * | 9/2006 | Gargi | 715/210 |
| 8,086,039 B2 | 12/2011 | Kletter | |
| 8,111,923 B2 | 2/2012 | Csurka et al. | |
| 8,144,947 B2 | 3/2012 | Kletter | |
| 8,233,716 B2 | 7/2012 | Kletter | |
| 8,233,722 B2 | 7/2012 | Kletter et al. | |
| 8,554,021 B2 | 10/2013 | Kletter | |
| 8,750,624 B2 | 6/2014 | Kletter | |
| 9,514,103 B2 | 12/2016 | Kletter | |
| 2009/0112864 A1 * | 4/2009 | Raichelgauz | G06F 17/30595 |
| 2009/0324026 A1 * | 12/2009 | Kletter | G06K 9/00442 |
| | | | 382/124 |
| 2010/0106751 A1 * | 4/2010 | Nagai | G06F 17/30017 |
| | | | 707/803 |
| 2011/0197121 A1 | 8/2011 | Kletter | |
| 2011/0282906 A1 * | 11/2011 | Wong | 707/780 |
| 2012/0062597 A1 * | 3/2012 | Mori | G06F 17/30268 |
| | | | 345/636 |
| 2012/0201468 A1 * | 8/2012 | Oami | G06K 9/00362 |
| | | | 382/199 |

OTHER PUBLICATIONS

Lichan Hong et al., "Annotate Once, Appear Anywhere: Collective Foraging for Snippets of Interest Using Paragraph Fingerprinting," CHI 2009, Boston, Massachusetts, 4 pages, Apr. 4-9, 2009.

(Continued)

*Primary Examiner* — Hares Jami

(74) *Attorney, Agent, or Firm* — Fay Sharpe LLP

(57) ABSTRACT

A method and system are provided that analyze a first digital asset to identify a set of attributes of the first digital asset. Search criteria are then formulated, and a search is conducted. Once search results are obtained, at least one second digital asset that is substantially identical to the first digital asset is identified. Then, metadata between the first digital asset and the second digital asset is shared.

27 Claims, 9 Drawing Sheets

(56) References Cited

OTHER PUBLICATIONS

G. Csurka et al., "Visual Categorization with Bags of Keypoints," In Workshop on Statistical Learning in Computer Vision, ECCV, 16 pages, 2004.
Saund, "PPD: Platform for Perceptual Document Analysis," PARC TR-2011-1, 89 pages, Nov. 2011 (http://www.parc.com) (Palo Alto Research Center, Incorporated).
"Generic Visual Categorizer," http://www.xeroxtechnology.com, Xerox Corporation, 2 pages, Printed Mar. 2012, Copyright 1999-2012.
"Generic Visual Categorizer," http://www.xrce.xerox.com, Xerox Research Centre Europe, 1 page, Apr. 2006.
Jackie Dove, "iPhoto '09: What you need to know," Macworld, 4 pages, Jan. 9, 2009.

\* cited by examiner

AUTOMATIC AND SEMI-AUTOMATIC METADATA GENERATION VIA INHERITANCE IN HOMOGENEOUS AND HETEROGENEOUS ENVIRONMENTS

BACKGROUND

Metadata is typically a text record that describes the content of a digital asset such as an image and enables search and retrieval. Metadata also contains other information about an image. For example, if the digital asset is a picture, metadata may indicate the identity of individuals in the picture, when the picture was taken and/or where the picture was taken. While image capture, including digitization, can be mechanized, metadata generation in general has not been mechanized, and is an excessively expensive and time consuming operation.

Metadata accompanying a digital asset can be as significant a part of the package as the image pixels themselves. Metadata for digital assets and, in particular, images is either generated manually or by editing a previous metadata record. Some metadata fields are filled with reference to a controlled vocabulary or authority which enables a uniform and standardized practice for assigning names to people, places, etc. Other metadata fields, such as those associated with an abstract or object description, are free form. As such, an abstract can take from 2 hours to 2 days to fill out, including the research. The Library of Congress Prints and Photographs Division estimates cataloging time for a digitized image at fifteen to thirty minutes for a brief description and up to an hour for a detailed item-level record.

Table 1 (below) shows an excerpt of the record for an image, which is part of the collection of The Henry Ford Museum. The contents of some fields, such as the Subject fields, use terms drawn from a naming authority and follow agreed upon standards. Others, such as Abstract, are free form. As noted above, researching and filling out the Abstract can take from two hours to two days. Other metadata fields can also be expensive to generate and generally require human input. As a result, it would be beneficial to organizations with large collections of images to have technologies that reduce the amount of labor required to generate metadata. Assistance would be beneficial in filling in the subject fields, e.g. some subject fields have plural terms and some objects always have the same subject terms.

| | |
|---|---|
| Title | 1913 Ford Model T Touring Car |
| Abstract | This 1913 Model T carried on the tradition of low-cost, high-production vehicles Henry Ford established with the 1909 Model T. The 1913 Model T included a significant body redesign that became the iconic look of the car for the next 12 years. <snip> |
| Object name | Automobile |
| Made data | 1913-02 |
| Physical description | Five passenger Model T Ford touring car with Brewster green metal body, black fenders, and running boards. Black leather top with side curtains. Black leather tufted seats. Folding windshield. Three doors. Tail light. Specifications: 4 cylinder engine en bloc 3.75" bore, 4" stroke |
| Subject-Corporate names | Ford Motor Company |
| Subject-Topical terms | Assembly-line methods\|Automobile industry\|Mass production |
| Subject-Genre terms | Automobiles\|Ford automobile\|Ford Model T automobile\|Touring cars |

Table 2 (below) shows excerpts from the bibliographic information for a photograph from the collection of the Library of Congress.

| | |
|---|---|
| TITLE | [Willow Creek, Creede, Colorado] |
| REPRODUCTION NUMBER | LC-DIG-fsac-1a34855 (digital file from original transparency) |
| SUMMARY | Photo shows buildings along Willow Creek, with Snowshoe Mountain in the distance. (Source: Flickr Commons project, 2009) |
| MEDIUM | 1 transparency: color. |
| CREATED/PUBLISHED | 1942 Dec. |
| CREATOR | Feininger, Andreas, 1906-1999, photographer. |
| NOTES | Transfer from U.S. Office of War Information, 1944. General information about the FSA/OWI Color Photographs is available at http://hdl.loc.gov/loc.pnp/pp.fsac Title devised by Library staff. Title from FSA or OWI agency caption misidentified the view as "Lead mine, Creede, Colo." Additional information about this photograph might be available through the Flickr Commons project at http://www.flickr.com/photos/library_of_congress/21799 14560 |
| SUBJECTS | World War, 1939-1945, Rivers, Mountains, United States--Colorado--Creede |
| PART OF | Farm Security Administration - Office of War Information Collection 12002-62 |

A known approach to saving time in preparing a bibliographic record is cloning: copying a record or starting with a template with the same medium type and/or from the same collection as the photograph being cataloged and then editing fields as needed. In the Library of Congress, it generally takes fifteen to thirty minutes for a brief description and up to an hour for a detailed item-level record. The record, and in particular, the Notes field can also change and grow over time. The Library of Congress uploads images to Flickr and monitors comments, sometimes updating their records based on the comments (after verification). The record in Table 2 is an example of this process.

BRIEF DESCRIPTION

In one aspect of the presently described embodiments, a method comprises analyzing a first digital asset to identify a set of attributes of the first digital asset, formulating search criteria based on the set of attributes, conducting a search in a network based on the search criteria to obtain search results, identifying at least one second digital asset substantially identical to the first digital asset based on the search results, and, sharing metadata between the first and second digital assets.

In another aspect of the presently described embodiments, the first digital asset is an image.

In another aspect of the presently described embodiments, the first digital asset is a text document.

In another aspect of the presently described embodiments, the first digital asset is the combination of an image and a text document.

In another aspect of the presently described embodiments, the set of attributes includes at least one of metadata, image features, catalog description information, GPS coordinates, date information, time information, and image hash information.

In another aspect of the presently described embodiments, the search criteria comprises a subset of a set of attributes.

In another aspect of the presently described embodiments, the search criteria comprises image features.

In another aspect of the presently described embodiments, the search criteria comprises a query.

In another aspect of the presently described embodiments, the sharing comprises importing the metadata into the first digital asset from the second digital asset.

In another aspect of the presently described embodiments, the sharing comprises extracting a portion of metadata from the second digital asset to be placed in the first digital asset.

In another aspect of the presently described embodiments, the sharing comprises deriving metadata for the first digital asset based on metadata in the second digital asset.

In another aspect of the presently described embodiments, the sharing comprises exporting the metadata from the first digital asset to the second digital asset.

In another aspect of the presently described embodiments, the system comprises a processor operative to analyze a first digital asset to identify a set of attributes of the first digital asset, formulate search criteria based on the set of attributes, and identify at least one second digital asset substantially identical to the first digital asset based on search results, a search module operative to conduct a search in a network based on the search criteria to obtain the search results, and, an output module operative to output at least one of the first and second digital assets with shared metadata.

In another aspect of the presently described embodiments, the first digital asset is an image.

In another aspect of the presently described embodiments, the first digital asset is a text document.

In another aspect of the presently described embodiments, the first digital asset is the combination of an image and a text document.

In another aspect of the presently described embodiments, the set of attributes includes at least one of metadata, image features, catalog description information, GPS coordinates, date information, time information, and image hash information.

In another aspect of the presently described embodiments, the search criteria comprises a subset of a set of attributes.

In another aspect of the presently described embodiments, the search criteria comprises image features.

In another aspect of the presently described embodiments, the search criteria comprises a query.

In another aspect of the presently described embodiments, the sharing comprises importing the metadata into the first digital asset from the second digital asset.

In another aspect of the presently described embodiments, the sharing comprises extracting a portion of metadata from the second digital asset to be placed in the first digital asset.

In another aspect of the presently described embodiments, the sharing comprises deriving metadata for the first digital asset based on metadata in the second digital asset.

In another aspect of the presently described embodiments, the sharing comprises exporting the metadata from the first digital asset to the second digital asset.

DETAILED DESCRIPTION

Figure 1:
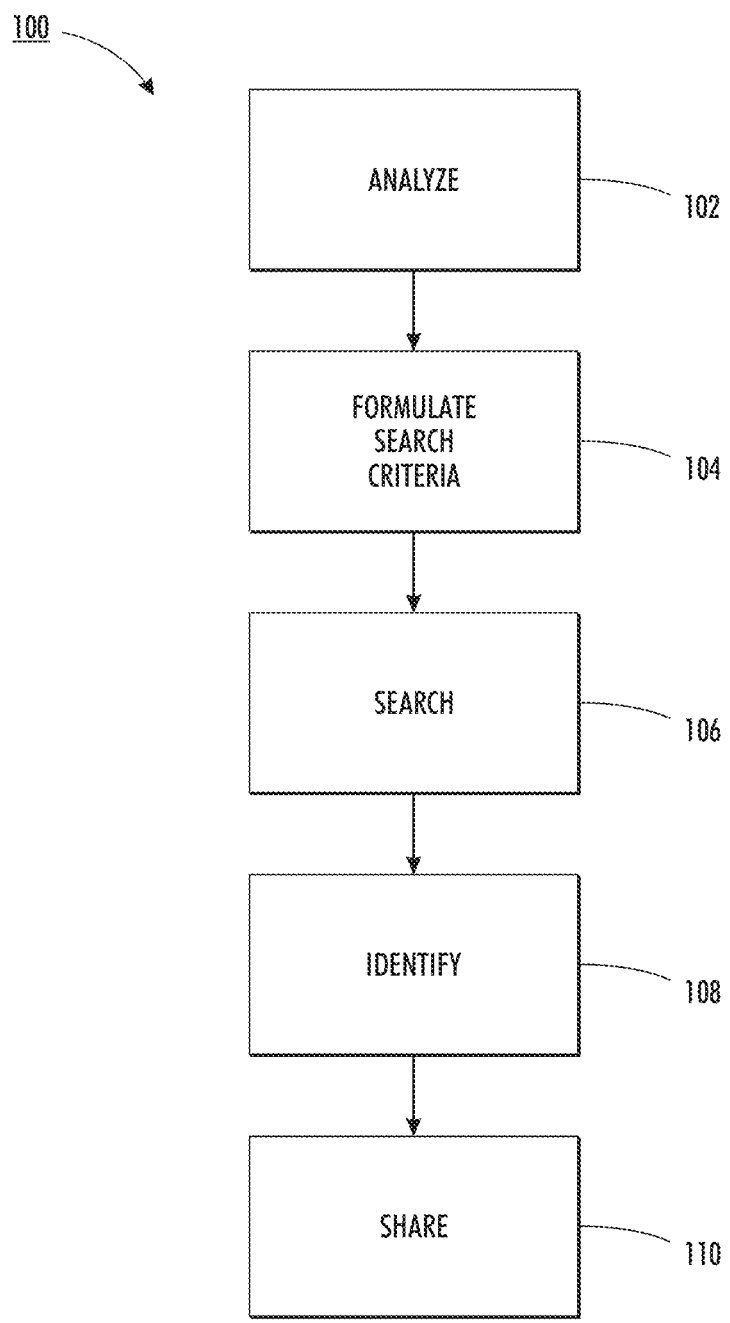
FIG. 1 is a flow chart illustrating one of the presently described embodiments.

With reference to FIG. 1, a method 100 according to the presently described embodiments is illustrated. In this regard, the method 100 includes analyzing (at 102) a first digital asset to identify a set of attributes of the first digital asset. Search criteria are then formulated (at 104), and a search is conducted (at 106). Once search results are obtained, at least one second digital asset—substantially identical to the first digital asset—is identified (at 108). Then, metadata between the first digital asset and the second digital asset is shared (at 110).

Figure 2:
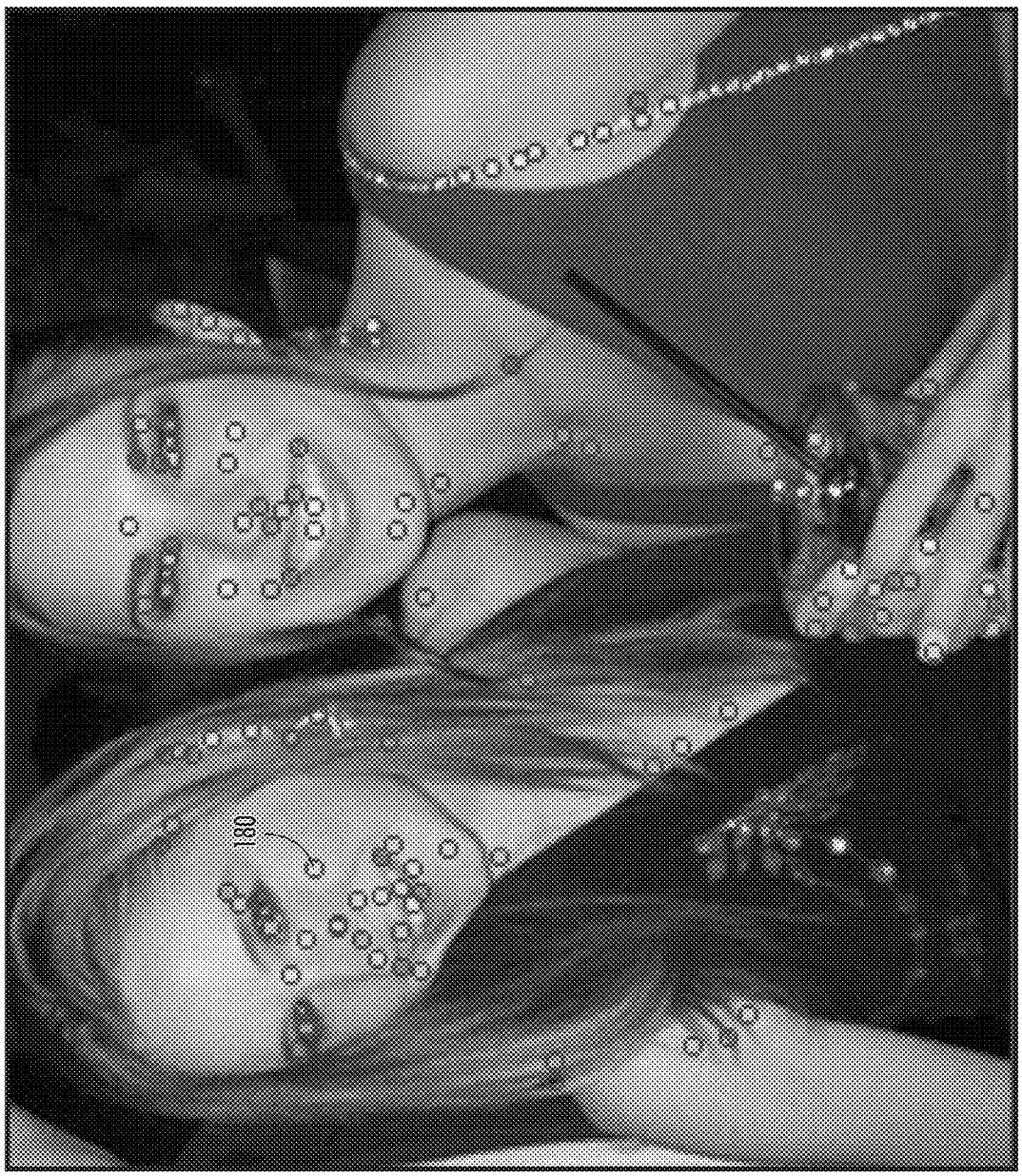
FIG. 2 is a sample image.

The first and second digital asset may take a variety of forms. However, in at least one form, the digital asset is an image. In the case of an image, as shown in FIG. 2, features (shown as blocks, e.g. at 180, overlaying the subjects of the image) can be computed, as is well known in the art. The features, such as the feature identified at 180, can then be used to find matches or near-matches. Of course, any such matching or near-matching image may also have metadata associated with the image—which can then be used as contemplated herein.

In another form, the digital asset is a text document. Still, in another form, the digital asset is a combination of image and text. Also, it should be appreciated that the digital assets contemplated may include digital assets in a variety of different environments including the environment of a library or archiving system.

As will be described in greater detail below, the search criteria may also take a variety of forms. In at least one form, the search criteria are based on the set of attributes that is identified in connection with the first digital asset. The set of attributes may be metadata (which may include, in some forms, metatag information), image features, catalog description information, GPS coordinates or other geographical identification metadata, dates and times for the scanning or origination of a digital asset or an image hash. The search criteria may be formed from all of the attributes or a subset of these attributes, such as the image features. In this regard, use of suitable image features will allow for a comprehensive and relatively reliable search to find identical images. The search criteria may also take the form of a query. The query may lead to search results that include a variety of possible matches for the first digital asset or, through a process of analysis and/or derivation of the search results (which may not be precise matches or may have a variety of different formats), simply lead the user to a more precise match for the first digital asset.

In this regard, various techniques for matching image features or fingerprinting may be used. These techniques are well known to those skilled in the art. Nonetheless, as examples, techniques described in U.S. Publication No. 2011/0197121 to Kletter, filed Feb. 5, 2010; U.S. Pat. No. 8,086,039 to Kletter, issued Dec. 27, 2011; and L. Hong and E. Chi, "Annotate Once, Appear Anywhere: Collective Foraging for Snippets of Interest Using Paragraph Fingerprinting," Proc. ACM CHI, pages 1791-1794, April 2009, all of which are incorporated herein by reference, may be used.

The method 100 includes a step for sharing the metadata between first and second digital assets. This, too, may take a variety of forms. In one form, selected metadata is imported into the first digital asset from the second digital asset. In a further form, selected metadata from the second digital asset is simply extracted from the second digital asset and placed into the first digital asset. In a still further form, metadata is derived for the first digital asset based on the metadata within the second digital asset. In a still further form, metadata is exported from the first digital asset to a second digital asset. In yet another form, a hyperlink may be added to the first digital asset that links to the second digital asset, allowing it to incorporate the metadata of the second digital asset "by reference."

Figure 3:
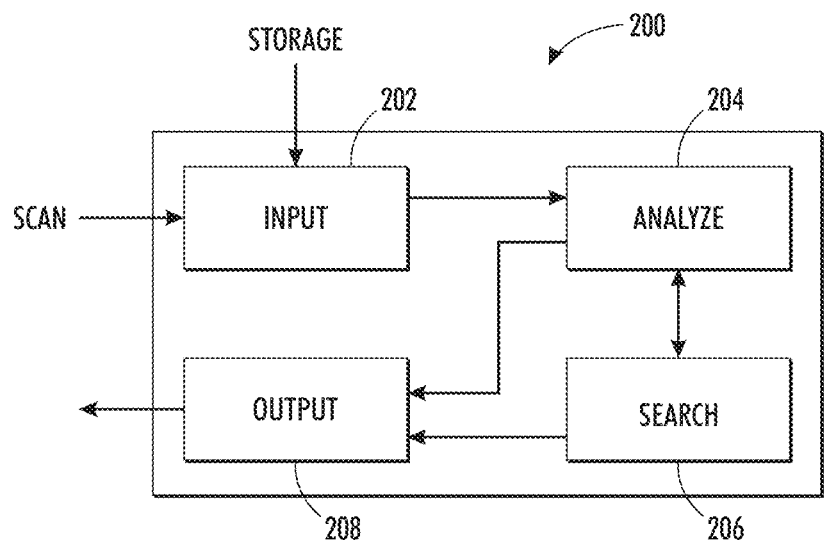
FIG. 3 is an exemplary system according to the presently described embodiments.

With reference now to FIG. 3, an example system according to the presently described embodiments is shown. The system 200 includes an input module 202, an analysis or processing module 204, and a search module 206. Also shown is an output module 208.

In operation, the method 100 described in FIG. 1 may be implemented on or by the system 200. In this regard, input module 202 is operative to receive a first digital asset from a scanner or storage module. The first digital asset is then analyzed or processed by the analysis module 204 to identify a set of attributes of the first digital asset and to formulate search criteria. The search module 206 then conducts a search based on the search criteria. Search results are obtained which are then processed by the analysis module 204 to determine at least one second digital asset substantially identical to the first digital asset. Once this is accomplished, sharing of metadata between the first and second digital assets is conducted. In this regard, as noted above, sharing may take a variety of forms but, in all forms, results in a transfer of metadata or derived metadata from one digital asset to another using, in one example form, the output module 208.

It should be appreciated that the system 200 may take a variety of forms. It may be a standalone system or may be comprised of several components that are configured to achieve the presently described embodiments. It should also be appreciated that the system 200 and the method 100 may be implemented using a variety of different software techniques and/or hardware configurations.

Figure 4:
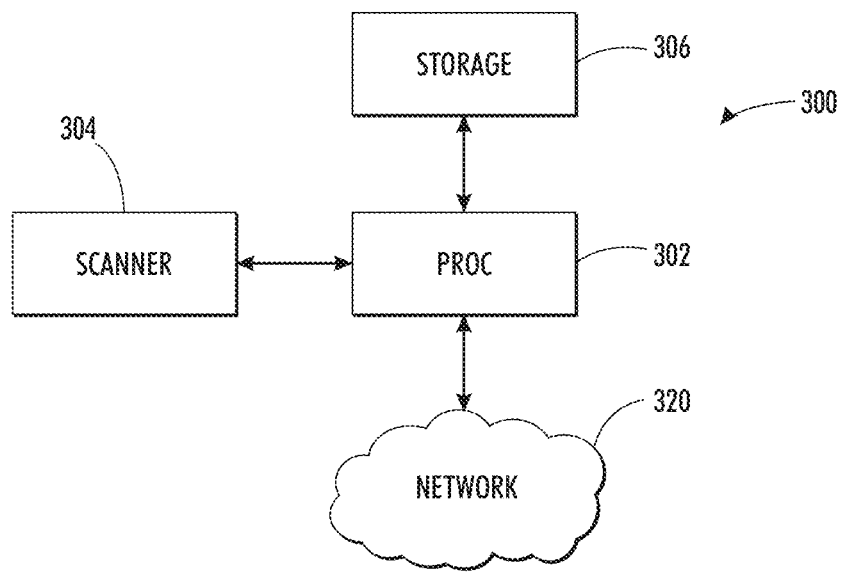
FIG. 4 is an exemplary system according to the presently described embodiments.

In this regard, with reference now to FIG. 4, an example system 300 includes a processor 302. In one form, the processor 302 houses the system 200 of FIG. 2 and, consequently, executes the method 100 of FIG. 1. Also shown in FIG. 3 are storage module 306 and scanner 304. The system 300, in one form, communicates with a network 320. The network 320 may take a variety of forms, including the internet. In at least one form, the processor 302 (e.g., through the search module 206 of the system 200) uses the network 320 during search functionality, and possibly during output functionality.

Figure 5:
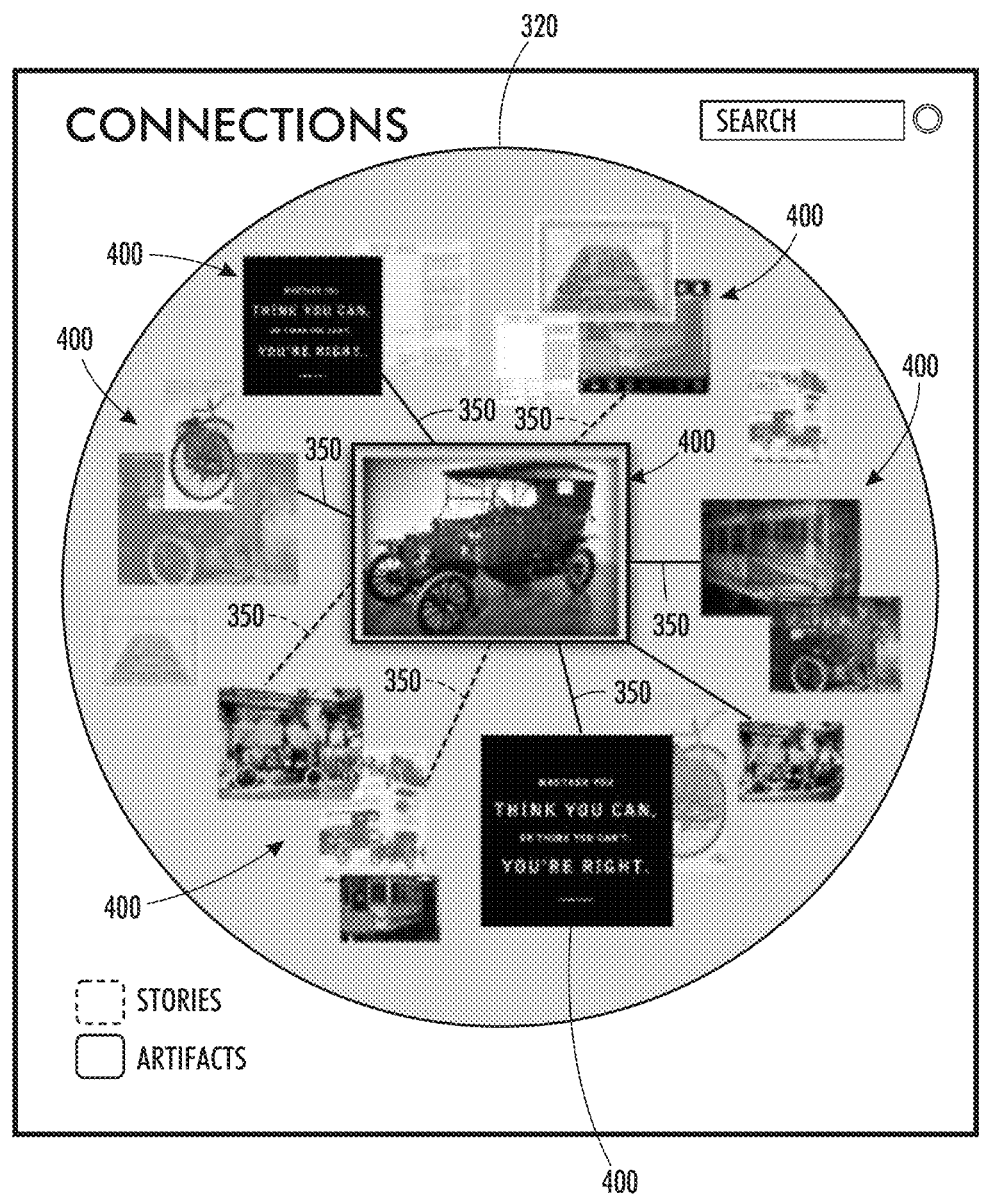
FIG. 5 is a sample network according to the presently described embodiments.

Also, in one form, the system 300 maintains a network of connections between elements of metadata, such as information about people, organizations, times, places, and topics. FIG. 5 shows a conceptual illustration of such a network 320 having connections 350 shown between select metadata elements 400 of the network. The example network 320 can be represented in the computer system as a graph database or relational database, for example. Embodiments can perform queries on the database or data structures that represent such a network, to find metadata elements related to any given metadata elements in any of a variety of manners. One example of such a query may seek "all metadata elements within 2 hops of the element representing Henry Ford" or "all person elements within 3 hops of Henry Ford" or "all metadata elements that are one hop away from the years 1914-1918,"

Figure 6:
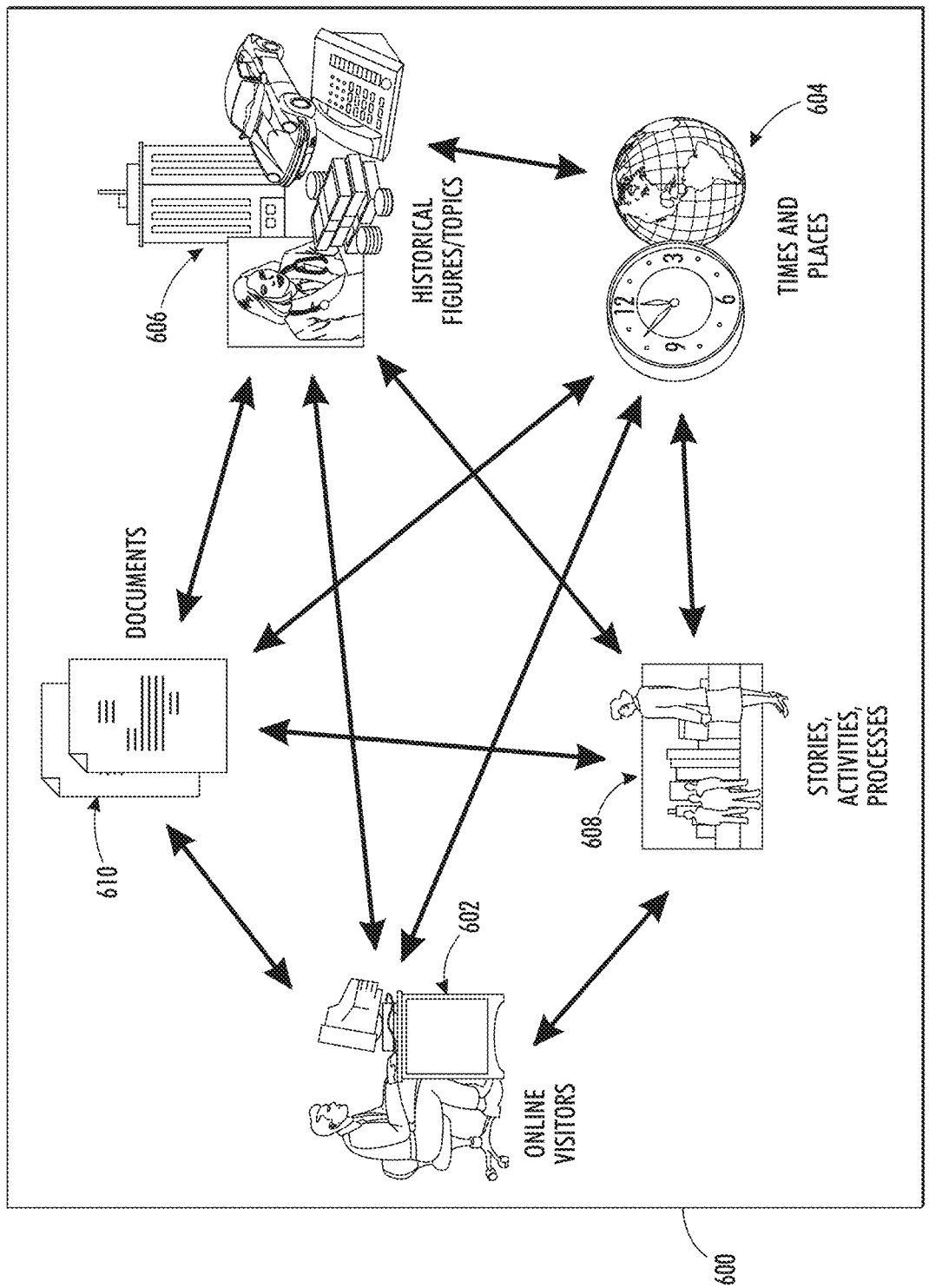
FIG. 6 is a sample network according to the presently described embodiments.
Figure 7:
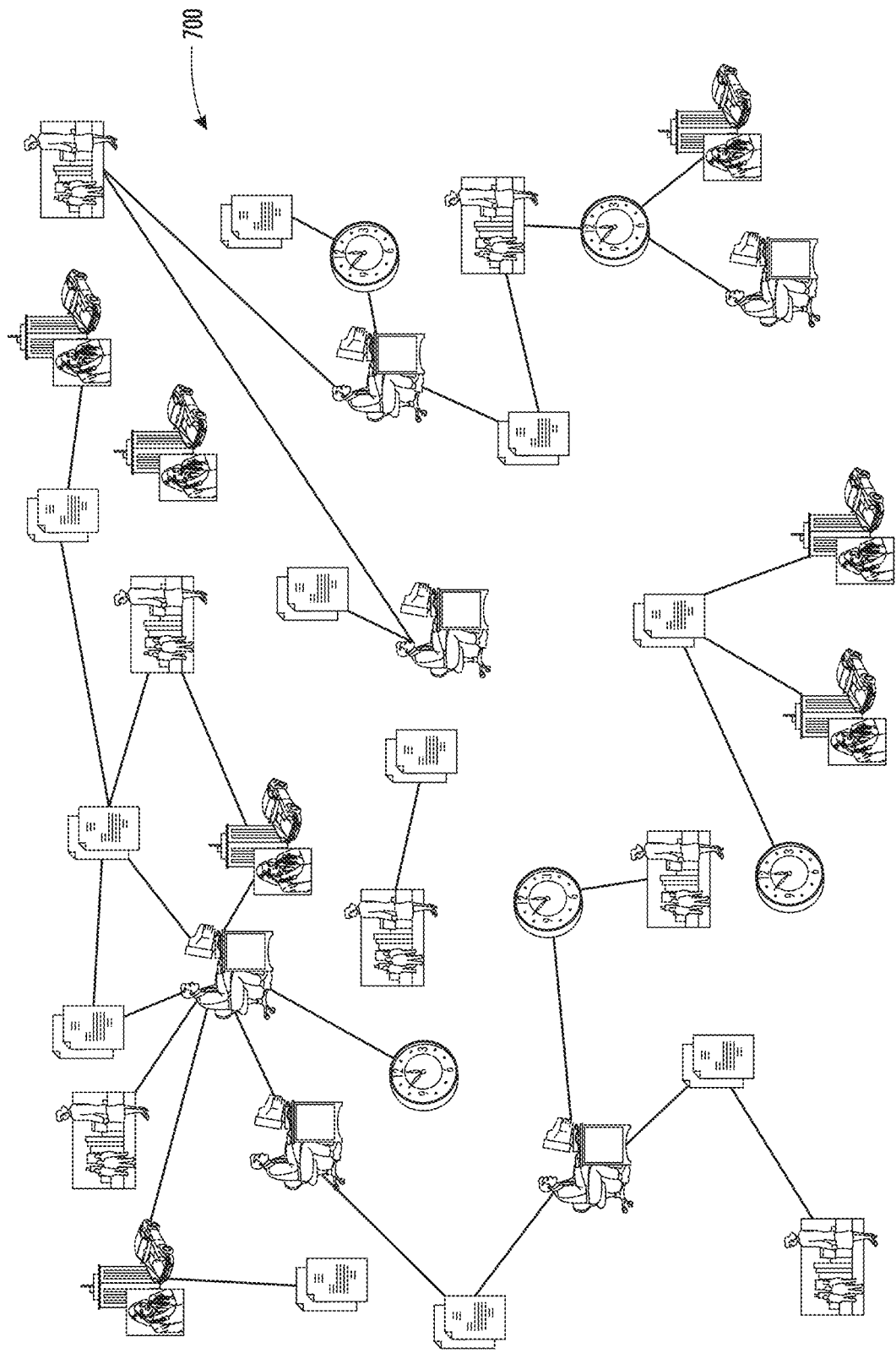
FIG. 7 is a sample network according to the presently described embodiments.

FIG. 6 shows a more general schema for such a network, identified by reference 600. Relationships between people or on-line visitors 602, times and places 604, topics 606, stories/activities/processes 608, or documents 610 are shown in the data structure of the schema 600. In FIG. 7, a similar schema is illustrated in a larger network 700.

The presently described embodiments, as described in FIGS. 1-7, may take on a variety of different configurations and be used in several environments. To help further explain the presently described embodiments, the following example embodiments will be described.

Accordingly, in one embodiment, a method is provided for augmenting the metadata content of a digital asset by importing metadata from a copy or near copy of the same asset found elsewhere. The assets could be digital images, in which case the copy or near copy is found using existing technologies such as image fingerprinting. Likewise, the assets could contain text paragraphs, in which case the copy or near copy is found using existing technologies such file, paragraph, or sentence fingerprinting.

Figure 8:
FIG. 8 is a sample image.
Figure 9:
FIG. 9 is a sample image.

In this embodiment, you start with Image A (FIG. 8), which is missing metadata, find a matching or near-matching Image B (FIG. 9), which has the desired metadata, which you then copy to Image A.

More generally, a digital object A, such as Image A, is received by the system—with an attribute vector identified or formulated by the system that includes metadata or tags as well as image features (when A is a digital image such as Image A). The attribute vector can also include a catalog description. The attribute vector has parts P and Q, the value of the attributes in P are filled in and known, while the value of those in Q are blank and unknown and, therefore, being sought. Next, a subset P' of the attribute set P is specified, and a search is conducted for other objects that have the same value of P'. In particular, P' can be a set of image features suitable for finding matching images.

The search returns at least one object B, such as Image B (FIG. 9), whose attribute subset P has the same value as the attribute subset P' of object A. The matching P' attributes, could be global positioning system (GPS) coordinates or other geographical identification metadata, the date and time a picture was taken or scanned (within some reasonable tolerance), a perceptual image hash or a combination of these ideas. In an image match, i.e., an image data match, P' includes image features. These features are attributes of both A and B. Note, they may not actually be part of the metadata record, but values computed from the image data. While B and A share the P' attribute values, B has other attributes which A is missing but that may apply to A.

Next, a subset of attributes Q' (that B has but A does not have) are copied into the attribute set Q of A. Q' is a subset of the attribute set Q. Not all of the missing Q attributes of A are necessarily found in B, only the Q' subset. Examples of attributes in Q' could be object description and subject terms. The attribute subset copied is one likely to be the same for A and B because the matching subset P' are the same. So, for example, if the match is performed on image features, it is likely that the subject would match—but there is no a priori reason to assume that the date and time the picture was taken would match.

The objective is to populate the missing metadata Q' of A with metadata from the object B that matches A along pre-specified dimensions P'. As noted earlier, some care is needed since not all of B's metadata would necessarily apply to A. For example, just because two pictures were taken at the same place within a few minutes of each other doesn't mean that they are images of the same item. This can be clearly seen upon review of FIGS. 8 and 9, where the photographs are not identical. Manual or automated verification may take place to confirm the appropriateness of sharing certain metadata.

The presently described embodiments use a method or User Interface (UI) for selecting the subset P' of object attributes to be used for searching. It may use a method or UI for selecting a subset of the matches for which the attributes Q' would apply and be copied. It may also have a method for manual approval of a match, depending on the confidence in the match according to the matching method.

Table 3, which is actual metadata for Image B (FIG. 9) from the Library of Congress catalog, helps illustrate an example of the implementation of this embodiment. The attributes in Table 3 have known values for Image B but unknown values for Image A. The image features for Image A are used to find a match to B. Then, a subset of attribute values for Image B is imported to Image A.

Those that do not match in this case are ones unique to the specific object and used to tell one object from another, i.e. catalog number.

It should be noted that the P' attributes could be a combination of the image features and the CREATED/PUBLISHED field (which would move it from the Q subset to the P and then P subset). It should also be noted that there are different kinds of match, from an exact match, a near match (as shown here) or a match based on semantic image content. The match could be obtained using various tools available today, such as those described in U.S. Pat. No. 8,144,947 to Kletter, issued Mar. 27, 2012; U.S. Pat. No. 8,086,039 to Kletter, issued Dec. 27, 2011; and U.S. Pat. No. 8,111,923 to Csurka et al., issued Feb. 7, 2012 (all of which are incorporated herein by reference), as well as other tools.

In this embodiment, the domains considered for the images include the same Q attributes and attribute formats (e.g. from the same collection). This is referred to as a homogeneous environment. Heterogeneous environments are considered below.

Also, it should be recognized that variations of this embodiment are possible. For example, if the feature set P' matches more than one existing artifact in the database, the presently described embodiments would allow some of the missing attributes Q to be filled in from a first matching

| Q attribute names | Q attribute values for Image B | Q values that apply to Image A, i.e. Q' subset |
|---|---|---|
| TITLE: | Employees on the "Sunshine" assembly line at North American's plant put the finishing touches on another B-25 bomber, Inglewood, Calif. | X |
| CALL NUMBER: | LC-USW36-245 <P&P>[P&P] | |
| REPRODUCTION NUMBER: | LC-DIO-fsac-1a35296 (digital file from original transparency) LC-USW361-245 (color film copy slide) | |
| RIGHT INFORMATION: | No known restrictions on publication. | X |
| MEDIUM: | 1 transparency: color. | X |
| CREATED/PUBLISHED: | 1942 Oct. | X |
| CREATOR: | Palmer, Alfred T., photographer. | X |
| NOTES: | Transfer from U.S. Office of War Information, 1944. General information about the PSA/OWI Color Photographs is available at http://hdl.loc.gov/loc.pnp/pp-fsac Title from FSA or OWI agency caption. In addition to the battle-tested B-25 ("Billy Mitchell") bomber, used in General Doolittle's raid on Tokyo, this plant produces the P-51 ("Mustang") fighter plane which was first brought into prominence by the British raid on Dieppe | |
| SUBJECTS: | North American Aviation, Inc. Airplane Industry Assembly-line methods World War. 1939-1945 Bombers United States--California--Inglewood | X |
| FORMAT: | Transparencies Color | X |
| PART OF: | Farm Security Administration - Office of War Information Collection 12002-38 | X |
| REPOSITORY: | Library of Congress Prints and Photographs Division Washington, D.C. 20540 USA http://hdl.loc.gov/loc.pnp/pp.print | X |
| DIGITAL ID: | (digital file from original transparency) fsac 1e35296 http://hdl.loc.gov/loc.pnp/fsac.1a35296 | |
| CONTROL #: | fsa1992001173/PP | |

In this example, the P' attributes of Image A are image features that determine Image B is a match. The Q attributes of B are the shown in the table: attribute names on the left, values in the middle column. While the images match, not all Q attribute values of Image B would apply to Image A. Those that do are marked with an X in the rightmost column.

artifact and additional missing attributes to be filled in from a second (or nth) matching artifact. Conflicts could be resolved algorithmically or by requesting human assistance.

The system could present to the user all of those artifacts that match P' (an equivalence class) and allow the user to specify the subset that should determine a given set of parameters Q'.

In cases where the images are identical in all aspects (e.g., two copies of the same image or document file) or nearly identical (e.g., the same photo rendered at two different resolutions), the set Q' is likely to be larger, allowing metadata such as the date the photo was taken to be copied.

A given artifact may match only a part of a second artifact. For example, an image artifact may match a figure in a text document, or an image artifact may be the cropped version of a second image. In this case, metadata inheritance may still be possible. For example, a document that contains an image of Henry Ford is likely to be about Henry Ford, at least in part, so Henry Ford could be added to the list of people mentioned by the document, if he is not already listed. Similarly, if the document includes a caption underneath the matching image, it is likely that the caption can be associated with the image as an alternative title.

If the artifact under consideration is a text document, the features to be matched P may be paragraphs or sentences, or fingerprints of paragraphs or sentences. For example, the fingerprint of a paragraph might be computed by making all characters lower case and turning all white space sequences into single spaces and then computing a hash. With such fingerprints, it is possible to determine efficiently which documents in the collection have many paragraphs in common or even all paragraphs in common with the given text document. Documents with significantly similar text content may inherit metadata from each other such as author names, topic tags, and so on.

The presently described embodiments describe a method for augmenting the metadata content of a digital asset by importing metadata it does not have from a copy or near copy of the same asset found elsewhere. The assets could be digital images, in which case the copy or near copy is found using existing technologies such as image fingerprinting. Likewise, the assets could contain text paragraphs, in which case the copy or near copy is found using existing technologies such as file, paragraph, or sentence fingerprinting.

In another embodiment, a method for applying and reusing the metadata content of a digital asset by exporting its metadata to a copy or near copy of the same asset found elsewhere. The assets could be digital images, in which case the copy or near copy is found using existing technologies such as image fingerprinting.

Here, the metadata record of a digital asset is known, and then other assets are determined for which the known metadata might apply.

In this embodiment, you start with Image A, which has metadata; find a matching Image B, which doesn't have or may be missing some metadata; and then copy the applicable metadata fields from Image A to Image B. Note, in the previous embodiments, the process started with an image or digital asset with missing metadata.

More generally, a digital object A is received in the system—with an attribute vector called P that can include metadata or tags as well as image features when A is a digital image. The attribute vector can also include a catalog description. Next, a subset P of the attribute set P is specified, and the subset is used to conduct a search for other objects that have the same value of P. In particular, P' can be a set of image features suitable for finding matching images. The P' vector can depend on how much metadata are already possessed by the objects over which the search is conducted. These objects may be images with scanner metadata or camera metadata only, and no catalog or bibliographic record, in which case the search would use some combination of image attributes and capture metadata.

The search returns at least one object B whose attribute subset P' matches the attribute subset P' of object A. The matching P' attributes, which could be GPS coordinates or other geographical identification metadata, the date and time a picture was taken or scanned, a perceptual image hash or a combination of these items. In an image match, i.e., an image data match, P' would consist of image features. The "match" of attributes would be within some reasonable tolerance, so that the image may not be an exact duplicate but similar enough. P' are attributes that both A and B have to begin with. Note that they may not actually be part of the metadata record, but values computed from the image data. While B and A share the P' attribute values, A has other attributes which B is missing but that may apply to B.

Next, a second subset P''' of attribute values (that A has but that B does not have) are copied from A to B. P''' is a subset of the attribute set P and has no intersection with the P' subset. Presumably both objects use the same metadata schema, which is where the reference to homogeneous environments comes from. This means there is no need for metadata crosswalk or interpretation; it's a straight copying of attribute values from A to B.

Examples of attributes in the P''' subset are object description and subject terms. The attribute subset that is copied is one likely to be the same for A and B because the matching subset P' are the same. So, for example, if the match is performed on image features, it is likely that the subject would match but there is no a priori reason to assume that the date and time the picture was taken would match. The attributes in P''' may be determined in advance based on a knowledge of the objects in the environment so that the copying can proceed automatically. Or a human may be asked to confirm the copy, just to make sure that the match on the specified attributes means the copied attributes should match as well.

So it should be noted that the attribute or metadata vector P consists of 3 subsets: P', P'' and P'''. P' and P''' have already been described: P' is used for finding an object B that matches object A and P''' is the metadata of A copied to B. P'' is the subset of attributes of A which don't apply to B, such as the Reproduction Number in Table 4.

This embodiment uses a method or UI for selecting the subset P' of object attributes to be used for searching. It may use a method or UI for selecting a subset of the matches for which the attributes P''' would apply and be copied. It may also have a method for manual approval of a match, depending on how confident the match is according to the matching method.

Table 4 illustrates implementation of this embodiment:

| P attribute names | P attribute values for Image A | P values that apply to Image B, i.e. P''' subset |
|---|---|---|
| TITLE: | Employees on the "Sunshine" assembly line at North American's plant put the finishing touches on another B-25 bomber, Inglewood, Calif. | X |

| P attribute names | P attribute values for Image A | P values that apply to Image B, i.e. P" subset |
| --- | --- | --- |
| CALL NUMBER: | LC-USW36-245 <P&P>[P&P] | |
| REPRODUCTION NUMBER: | LC-DIG-fsac-1a35296 (digital file from original transparency)<br>LC-USW361-245 (color film copy slide) | |
| RIGHTS INFORMATION: | No known restrictions on publication. | X |
| MEDIUM: | 1 transparency: color. | X |
| CREATED/PUBLISHED: | 1942 Oct. | X |
| CREATOR: | Palmer, Alfred T., photographer. | X |
| NOTES: | Transfer from U.S. Office of War Information, 1944.<br>General information about the FSA/OWI Color Photographs is available at http://hdl.loc.gov/loc.pnp/pp.fsac<br>Title from FSA or OWI agency caption.<br>In addition to the battle-tested B-25 ("Billy Mitchell") bomber, used in General Doolittle's raid on Tokyo, this plant produces the P-51 ("Mustang") fighter plane which was first brought into prominence by the British raid on Dieppe | X |
| SUBJECTS: | North American Aviation, Inc.<br>Airplane industry<br>Assembly-line methods<br>World War, 1939-1945<br>Bombers<br>United States--California--Inglewood | X |
| FORMAT: | Transparencies Color | X |
| PART OF: | Farm Security Administration - Office of War Information Collection 12002-38 | X |
| REPOSITORY: | Library of Congress Prints and Photographs Division<br>Washington, D.C. 20540 USA<br>http://hdl.loc.gov/loc.pnp/pp.print | X |
| DIGITAL ID: | (digital tile from original transparency) fsac 1a35296<br>http://hdl.loc.gov/loc.pnp/fsac.1a35296 | |
| CONTROL #: | fsa1992001173/PP | |

In this example, the P' attributes of Image A are image features that determine if Image B is a match. The remaining P attributes of A, i.e. P"+P"', are the ones shown in the table, and make up the bibliographic record: attribute names on the left, values in the middle column. While the images match, not all of the remaining attribute values of Image A would apply to Image B. Those that do are marked with an X in the rightmost column. These are the attributes in the P" subset. Those that don't in this case are ones unique to the specific object and used to tell one object from another, i.e. catalog number.

It should be noted that the P' attributes could be a combination of the image features and the CREATED/PUBLISHED field. It should also be noted that there are different kinds of match, from an exact match, a near match (as shown here) or a match based on semantic image content. The match could be obtained using various tools available today, such as those described in U.S. Pat. No. 8,144,947 to Kletter, issued Mar. 27, 2012; U.S. Pat. No. 8,086,039 to Kletter, issued Dec. 27, 2011; and U.S. Pat. No. 8,111,923 to Csurka et al., issued Feb. 7, 2012 (all of which are incorporated herein by reference), as well as other tools.

The embodiments described thus far operate in homogeneous environments, where the assets have the same metadata format (automatic and semi-automatic metadata generation via inheritance in homogeneous environments). The next embodiment is intended for heterogeneous environment, where the metadata formats of the assets are different, so that the metadata or tags have to be extracted.

In this next embodiment, you start with Image A, which is missing metadata or a tag, find a matching Image B, which has the desired metadata, which you then apply to Image A. One difference in this embodiment is that the values of attributes in the set Q' may not be explicitly given or be in a different format in B than A expects, so that the attribute values have to be derived or extracted, as shown in the following example.

This embodiment supports search queries such as "Tell me about the image I have by finding ones like it."

Figure 10:
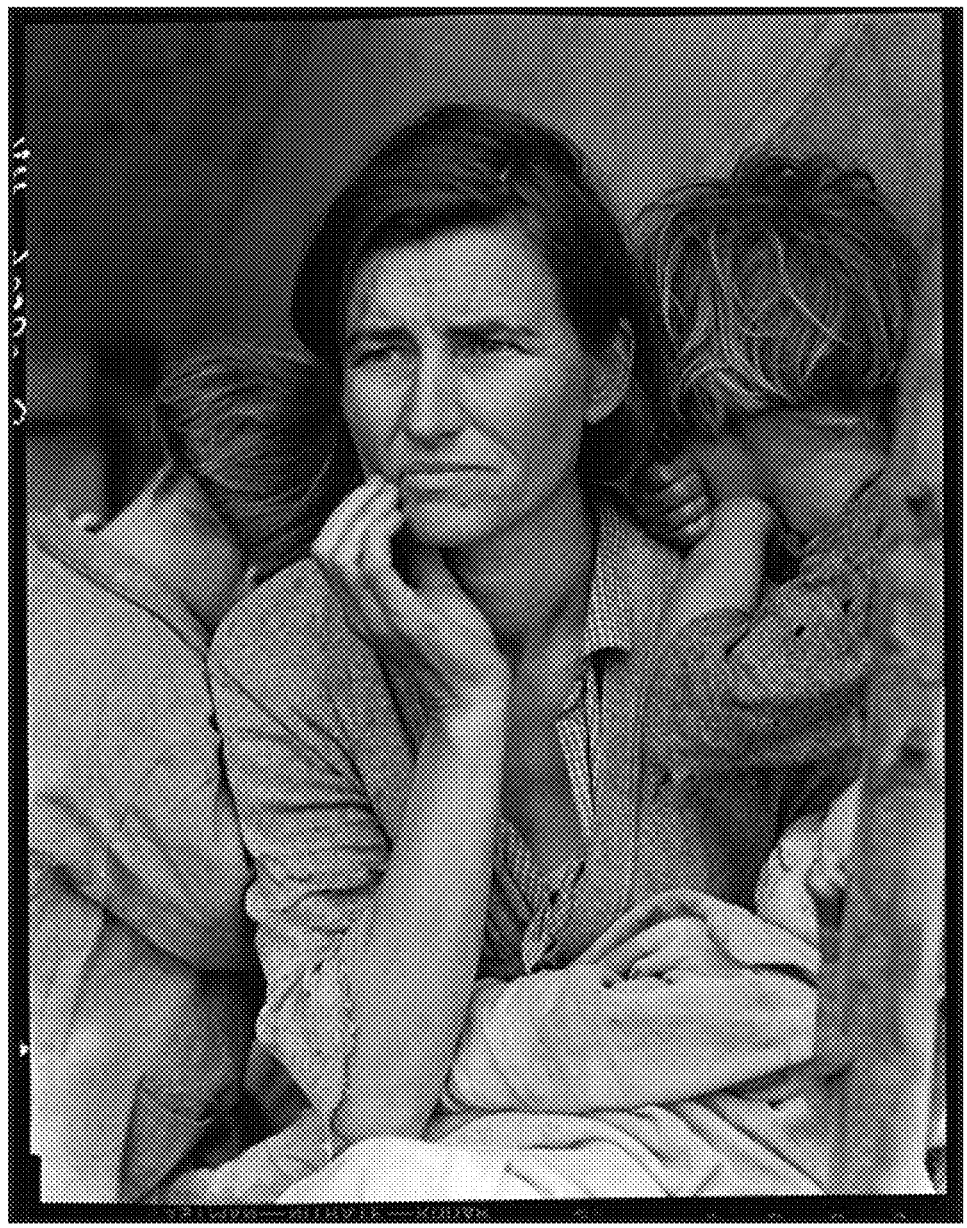
FIG. 10 is a sample image.

Take, for example, the image of the Migrant Mother, shown in FIG. 10.

In answer to the query "Who is the person in this picture?", a search on the image (using tineye for example) may return webpages which, when subjected to semantic analysis (using Open Calais for example) may return the Person Values Dorothea Lange and Florence Owens Thompson.

A more sophisticated analysis of the text may conclude that the photograph has become known as "Migrant Mother," and is one of a series of photographs that Dorothea Lange made of Florence Owens Thompson and her children in February or March of 1936 in Nipomo, Calif. In this latter form, the names occur and make clear the identities of the photographer and the subject of the photograph, and thus answer the original query.

More generally, if the feature set P' matches more than one existing artifact in the database, the presently described embodiments allow some of the missing attributes Q to be filled in from a first matching artifact and additional missing attributes to be filled in from a second (or nth) matching artifact. Conflicts could be resolved algorithmically or by requesting human assistance.

The system could present to the user all of those artifacts that match P' (an equivalence class) and allow the user to specify the subset that should determine a given set of parameters Q'.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for metadata generation comprising:
analyzing a first digital asset to identify a set of attributes of the first digital asset, the set of attributes being defined in an attribute vector having a part with known attribute values and another part with sought attribute values;
formulating search criteria based on at least one subset of the known attribute values;
conducting a search in a network based on the search criteria using a fingerprinting technique to obtain search results identifying other digital assets having a matching set of attributes with the at least one subset of the known attribute values of the first digital asset to identify sharable metadata;
identifying, in the other digital assets, at least one second digital asset matching the first digital asset based on the search results;
selectively determining metadata of the second digital asset corresponding to the sought attribute values to be shared with the first digital asset, excluding metadata of the second digital asset corresponding to the known attribute values and metadata that does not apply to the first digital asset; and,
sharing the selectively determined metadata of the second digital asset with the first digital asset.

2. The method as set forth in claim 1 wherein the first digital asset is an image.

3. The method as set forth in claim 1 wherein the first digital asset is a text document.

4. The method as set forth in claim 1 wherein the first digital asset is the combination of an image and a text document.

5. The method as set forth in claim 1 wherein the set of attributes includes at least one of metadata, image features, catalog description information, GPS coordinates, geographic place names, date information, time information, and image hash information.

6. The method as set forth in claim 1 wherein the search criteria comprises image features.

7. The method as set forth in claim 1 wherein the search criteria comprises a query.

8. The method as set forth in claim 1 wherein the sharing comprises importing the metadata into the first digital asset from the second digital asset.

9. The method as set forth in claim 1 wherein the sharing comprises extracting a portion of metadata from the second digital asset to be placed in the first digital asset.

10. The method as set forth in claim 1 wherein the sharing comprises deriving metadata for the first digital asset based on metadata in the second digital asset.

11. The method as set forth in claim 1 wherein the metadata generation method is performed in a library or archiving system.

12. The method as set forth in claim 1 wherein the fingerprinting technique comprises at least one of image, file, paragraph or sentence fingerprinting.

13. A method for metadata generation comprising:
analyzing a first digital asset to identify a set of attributes of the first digital asset, the set of attributes being defined in an attribute vector;
formulating search criteria based on at least one subset of the attribute vector;
conducting a search in a network based on the search criteria using a fingerprinting technique to obtain search results identifying other digital assets having a matching set of attributes with the at least one subset of the attribute vector of the first digital asset to identify sharable metadata;
identifying, in the other digital assets, at least one second digital asset matching the first digital asset based on the search results;
selectively determining first metadata of the first digital asset corresponding to sought attribute values to be shared with the second digital asset and second metadata corresponding to attribute values that do not apply to the second digital asset, the first and second metadata having no intersection with the subset of the attribute vector; and,
exporting the first metadata from the first digital asset to the second digital asset.

14. A system for metadata generation comprising at least one processor and a memory, the at least one processor being configured to:
analyze a first digital asset to identify a set of attributes of the first digital asset, the set of attributes being defined in an attribute vector having a part with known attribute values and another part with sought attribute values, formulate search criteria based on at least one subset of the known attribute values, identify at least one second digital asset matching the first digital asset based on search results, and selectively determine metadata of the second digital asset corresponding to the sought attribute values to be shared with the first digital asset, excluding metadata of the second digital asset corresponding to the known attribute values and metadata that does not apply to the first digital asset;
conduct a search in a network based on the search criteria using a fingerprinting technique to obtain the search results identifying other digital assets having a matching set of attributes with the at least one subset of the known attribute values of the first digital asset to identify sharable metadata; and,
output to the first digital asset shared metadata.

15. The system as set forth in claim 14 wherein the first digital asset is an image.

16. The system as set forth in claim 14 wherein the first digital asset is a text document.

17. The system as set forth in claim 14 wherein the first digital asset is the combination of an image and a text document.

18. The system as set forth in claim 14 wherein the set of attributes includes at least one of metadata, image features, catalog description information, GPS coordinates, geographic place names, date information, time information, and image hash information.

19. The system as set forth in claim 14 wherein the search criteria comprises image features.

20. The system as set forth in claim 14 wherein the search criteria comprises a query.

21. The system as set forth in claim 14 wherein the shared metadata comprises metadata imported into the first digital asset from the second digital asset.

22. The system as set forth in claim 14 wherein the shared metadata comprises a portion of metadata extracted from the second digital asset to be placed in the first digital asset.

23. The system as set forth in claim 14 wherein the shared metadata comprises metadata derived for the first digital asset based on metadata in the second digital asset.

24. The system as set forth in claim 14 wherein the system maintains a network of connections between elements of metadata.

25. The system as set forth in claim 14 wherein the system is implemented in a library or archiving system.

26. The system as set forth in claim 14 wherein the fingerprinting technique comprises at least one of image, file, paragraph or sentence fingerprinting.

27. A system for metadata generation comprising at least one processor and a memory, the at least one processor being configured to:
   analyze a first digital asset to identify a set of attributes of the first digital asset, the set of attributes being defined in an attribute vector, formulate search criteria based on at least one subset of the attribute vector, identify at least one second digital asset matching the first digital asset based on search results, and selectively determine first metadata of the first digital asset corresponding to sought attribute values to be shared with the second digital asset and second metadata corresponding to attribute values that do not apply to the second digital asset, the first and second metadata having no intersection with the subset of the attribute vector;
   conduct a search in a network based on the search criteria using a fingerprinting technique to obtain the search results identifying other digital assets having a matching set of attributes with the at least one subset of the attribute vector of the first digital asset to identify sharable metadata; and
   output the first metadata from the first digital asset to the second digital asset.

* * * * *